United States Patent

Pegoraro et al.

[11] Patent Number: 5,291,983
[45] Date of Patent: Mar. 8, 1994

[54] APPARATUS FOR ALIGNING AND UNIFORMLY ORIENTING FISH

[75] Inventors: Giuliano Pegoraro, Bjuv; Lars G. A. Wadell, Aengelholm, both of Sweden

[73] Assignee: Nestec S.A., Vevey, Switzerland

[21] Appl. No.: 984,357

[22] Filed: Dec. 2, 1992

[30] Foreign Application Priority Data

Dec. 20, 1991 [EP] European Pat. Off. ........ 91121890.7

[51] Int. Cl.⁵ ............................................. B65G 47/24
[52] U.S. Cl. ...................................... 198/399; 198/401
[58] Field of Search ............... 198/382, 399, 400, 401, 198/394, 395, 396, 406; 482/179, 180, 182

[56] References Cited

U.S. PATENT DOCUMENTS

| 1,649,304 | 11/1927 | Gray. | |
|---|---|---|---|
| 1,967,228 | 7/1934 | Drevitson | 198/399 X |
| 1,972,489 | 9/1934 | Rideout et al. | 198/399 |
| 3,229,326 | 1/1966 | Eriksen | 198/399 X |
| 3,348,260 | 10/1967 | Bartels et al. | 198/400 X |
| 3,661,240 | 5/1972 | Baumann | 198/398 X |
| 3,967,724 | 7/1976 | Allen et al. | 198/399 X |
| 4,225,031 | 9/1980 | Frisbie et al. | 198/399 X |
| 4,261,680 | 4/1981 | Carnley et al. | 198/399 X |
| 4,703,679 | 11/1987 | Hayashi et al. | 198/400 X |

FOREIGN PATENT DOCUMENTS 1423344 11/1965 France.
0043412 2/1989 Japan .................................. 198/399

OTHER PUBLICATIONS

Pietzsch, et al., International/PCT Abstract of WO 83/01020 (1983).

*Primary Examiner*—James R. Bidwell
*Attorney, Agent, or Firm*—Vogt & O'Donnell

[57] ABSTRACT

An apparatus for aligning and uniformly orienting fish includes a shuffle feed device for aligning and discharging fish in a single line and a conveyor having a longitudinal upper run positioned for receiving and conveying aligned and discharged fish in a single line, in which fish are orientated in the longitudinal plane of the conveyor. A sensor including an upper photocell and a lower photocell is positioned at a downstream end of the conveyor such that, in operation, the sensor distinguishes between head-end-first and tail-end-first orientations of fish passing the sensor based upon the sequence of activation of the photocells. Fish passing the sensor are uniformly oriented in the same orientation by control of the sensor.

6 Claims, 3 Drawing Sheets

APPARATUS FOR ALIGNING AND UNIFORMLY ORIENTING FISH

BACKGROUND OF THE INVENTION

The present invention relates to apparati and processes for aligning fish, such as cod, and orienting them in the same orientation in single file.

Fish usually arrive at the factory in kits of 60 which comprise fish of various sizes and weights, and it is necessary to grade them either by length or weight before further processing. At the present time, the alignment and feeding of fish to a grading system is carried out manually, an operation which is slow and tiring and results in a feed rate of only about 30 fish/minute.

Shuffle feed apparati are well known for the handling of fruit and vegetable products to control the feed rate to a processing station. They utilize parallel-positioned feed members which are reciprocated back and forth in opposite directions in a wave action to align articles received in bulk random form in a single file order along their leading edges.

SUMMARY OF THE INVENTION

Accordingly, the present invention provides an apparatus for aligning and uniformly orienting fish comprising a shuffle feed device for aligning and discharging fish in a single line, a conveyor having a longitudinal upper run positioned for receiving and conveying aligned and discharged fish in a single line in which the fish are oriented in the longitudinal plane of the conveyor, a sensor comprising an upper photocell and a lower photocell positioned at a downstream end of the conveyor such that, in operation, the sensor distinguishes between head-end-first and tail-end-first orientations of the fish passing the sensor based upon the sequence of activation of the photocells, and means controllable by the sensor for uniformly orienting fish passing the sensor in the same head-end-first or tail-end-first orientation.

The present invention also provides a process for uniformly aligning and orienting fish in the same orientation and in single file, which comprises shuffle feeding fish contained in a hopper over an edge of the hopper to discharge the fish from the hopper, conveying and aligning the fish in single lengthwise files, detecting the orientation of the fish and, based upon their detected orientation, uniformly orienting the fish in a line in the same head-end-first or tail-end-first orientation.

DESCRIPTION OF PREFERRED EMBODIMENTS

The shuffle feed device for use in the apparatus of the present invention is advantageously provided with specially designed feed ledge faces for carrying fish and is conveniently mounted in a hopper adapted to contain the fish.

As described in more detail below in connection with the description of the drawing Figures, the shuffle feed apparatus is embodied within a hopper interior to have a plurality of adjacent longitudinally extending reciprocal elements, each of which extend to an upper ledge face for supporting fish and form a step-wise configuration ascending towards the hopper rim, the fish being discharged over the hopper rim by an uppermost support ledge positioned adjacent the rim. Each ledge face has a lengthwise arcuate concave surface and a widthwise bevel for holding the fish.

A conveyor for receiving the discharged fish may be conveniently positioned adjacent a leading edge of the shuffle feed device and may be, for instance, a V-shaped belt. Advantageously, the conveyor juxtaposed to the sensor is an acceleration belt positioned downstream of the V-shaped receiving conveyor for receiving the discharged fish to space the fish one from another prior to passing the sensor.

As described in more detail below, each fish lies on its side as it is transported past the orientation sensor to enable determining whether a head end or tail end first passes the sensor. The sensor advantageously comprises two photocells positioned one above the other so that the sequence of activation of the upper photocell and the lower photocell provides for distinguishing between head-end-first and tail-end-first orientations of the passing fish. If the fish passes the sensor with the head end orientated first, then the upper and lower photocells are activated almost simultaneously, whereas if the fish passes the sensor tail end oriented first the lower photocell is activated well before the upper photocell. A control device records the time difference of detection and activates the means to orient the fish accordingly.

The means to uniformly orient the fish in the same orientation is advantageously provided by a pivotable reversible conveyor and two chutes positioned, respectively, for receiving fish from the downstream end or the upstream end of the conveyor when pivoted, i.e., inclined forwards or backwards. An additional conveyor is positioned for receiving fish from each of the chutes, thereby providing a uniformly oriented line of fish. The pivotable reversible conveyor is tiltable about an axis transverse to a line of the reversible directions of travel of the conveyor, the operation of the pivotable conveyor being discussed further below in connection with the description of the drawing Figures.

Preferably, all the conveyors used in the invention are endless belts.

The present invention is further described by way of example with reference to the accompanying drawings.

DETAILED DESCRIPTION OF THE DRAWINGS

Figure 2:
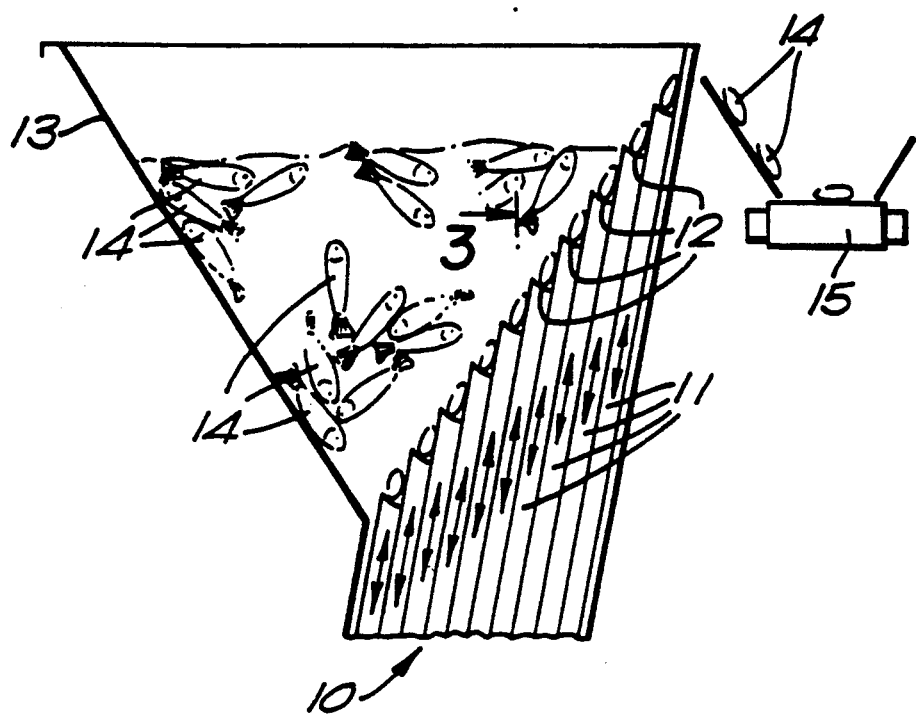
FIG. 2 represents a schematic side sectional view of a shuffle feed apparatus in a hopper containing fish according to the invention.
Figure 3:
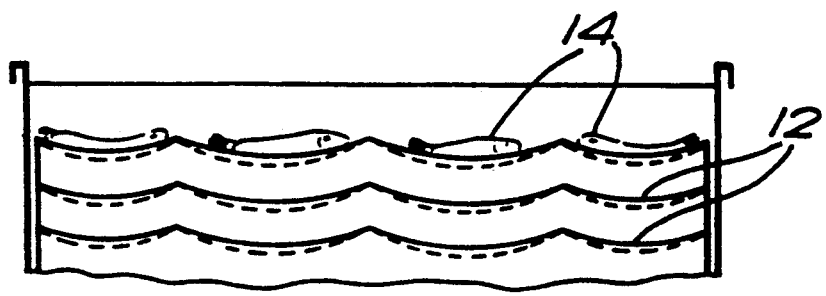
FIG. 3 is a sectional view taken along the line 3—3 of FIG. 2 looking in the direction of the arrows.

Referring to the drawings, the apparatus of the invention includes a shuffle feed device 10, such as shown in FIGS. 2 and 3, provided with specially designed feed members 11 in rows of four provided with specially shaped upper faces 12 adapted to accommodate fish in a hopper 13 for receiving fish 14 in a bulk random form.

The illustrated shuffle feed device comprises a series of ascending adjacent rows, with top surface portions for holding fish, which reciprocate to alternately move fish from the top surface portion of a lower row to the top surface portion of a higher row, from a position within the hopper, below the hopper rim, to the highest row, where the fish are then discharged to a conveyor. The top of each row comprises a series of crests which separate adjacent concave arcs which define channels for holding fish.

Figure 1:
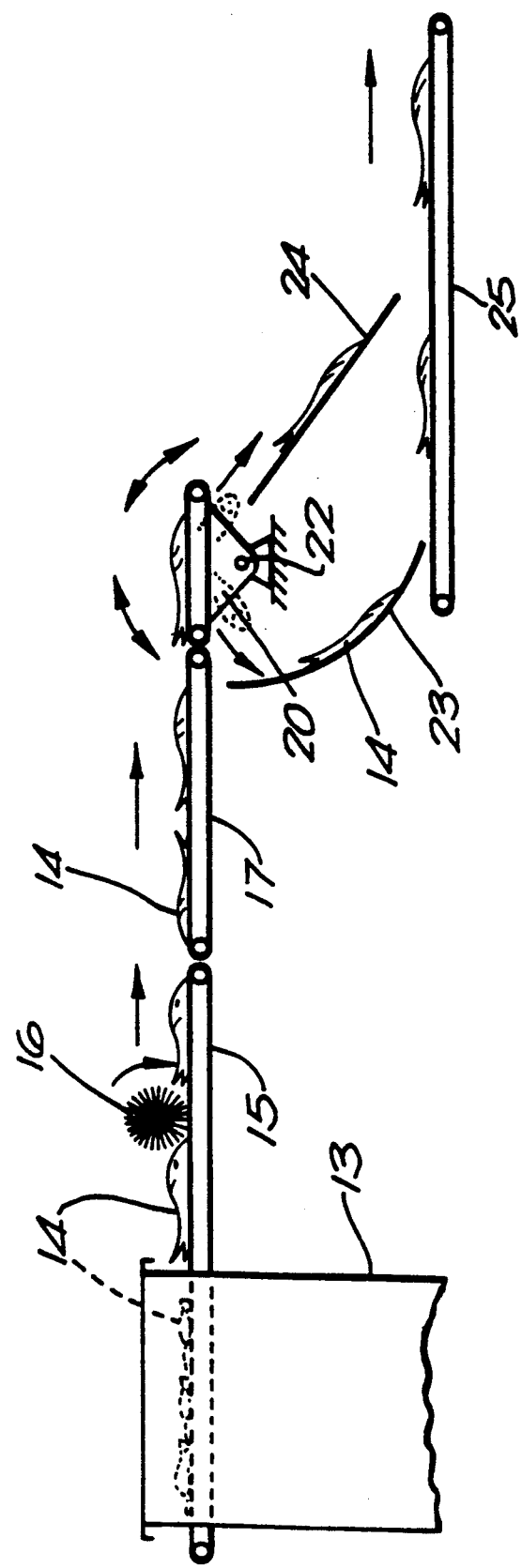
FIG. 1 represents a schematic side sectional view of an apparatus according to the present invention.
Figure 4A:
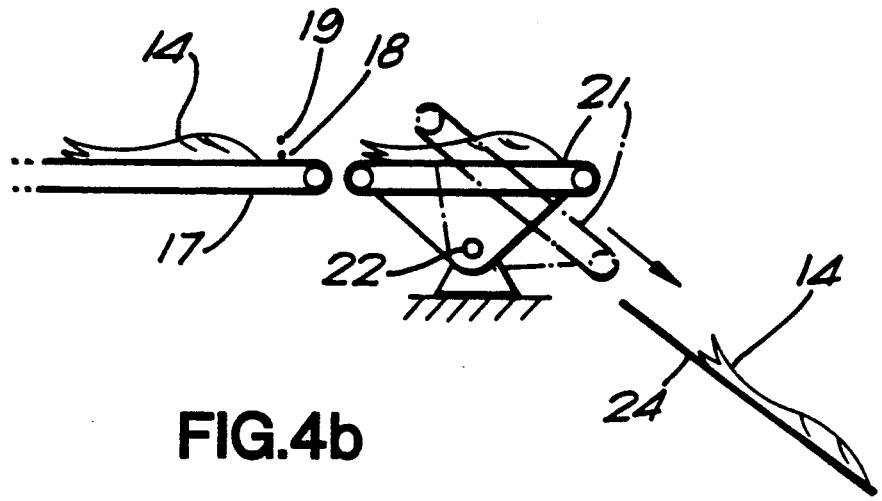
FIGS. 4a and 4b are schematic side views of the sensor and the means for uniformly orienting the fish in the same direction.
Figure 4B:
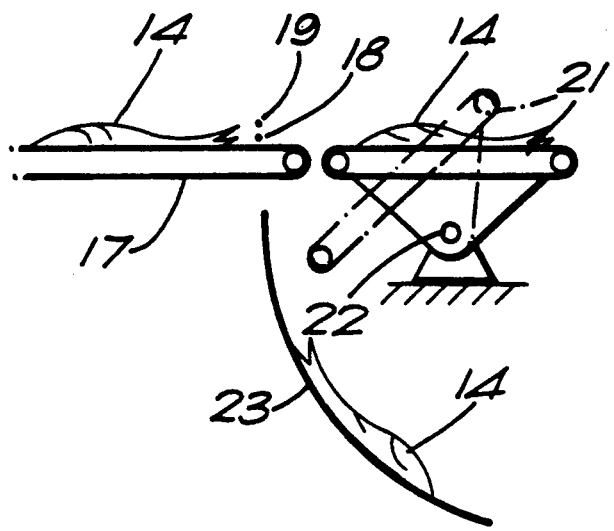
Figure 5A:
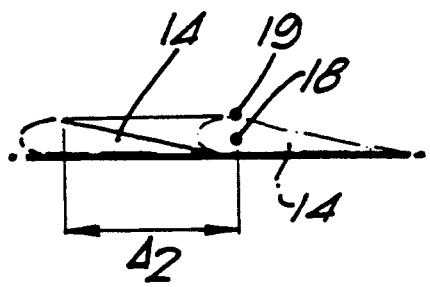
FIGS. 5a and 5b are schematic side views illustrating the sensor in more detail.
Figure 5B:
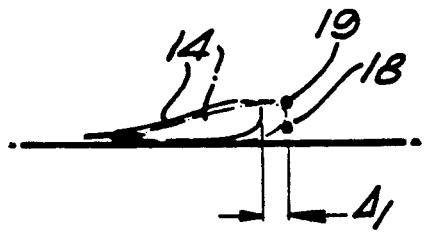

As illustrated in FIGS. 1 and 2, positioned adjacent the hopper just below the row of upper feed members 11 is an endless conveyor belt 15 above which is a rotating brush 16. As illustrated in FIGS. 4a and 4b, downstream of the conveyor belt 15 is an acceleration belt 17 with a pair of photocells 18, 19 positioned at the downstream end. A pivotable reversible endless conveyor belt 20 with an upper run 21, pivoted at point 22, is positioned downstream of the acceleration belt 17, and chutes 23 and 24 slope forwards from the upstream and downstream ends respectively of the pivotable reversible belt 20, the lower ends of which lie above a conveyor belt 25.

In operation, codfish 14 are fed into the hopper 13 in bulk random form. The feed members 11 of the shuffle feed apparatus 10 are reciprocated along paths parallel to each other in opposite directions, as indicated by the arrows, in a wave action so that the codfish are alternately pushed up the side of the next feed member by the face of the last and adjacent feed member so as to advance the codfish 14 on the upper faces 12 from where they are discharged in rows of four over the top edge of the hopper onto the conveyor 15, preferably a V-shaped belt. They are then transported beneath the rotating brush 16 which serves to separate and straighten them so as to align them in single file and then transport them to the acceleration belt 17 to space them from each other. As can be seen from FIGS. 4a, 4b, 5a and 5b, the sensor photocells are positioned at a downstream end of the acceleration belt. When the codfish travels head end first, photocells 18 and 19 are activated almost simultaneously and the time difference $\Delta_1$ is very short, whereas when the codfish travels tail end first, photocell 18 is activated much earlier than the photocell 19 and the time difference $\Delta_2$ is longer. These time differences are recorded by a control device (not shown) which activates the pivotable reversible endless conveyor belt 20 to pivot about pivot 22 so that the upper run 21 tilts forwards or backwards according to the time difference. The operation to orient all the codfish head-end-first is as follows. If a codfish is travelling head-end-first past the photocells, because of the short time difference $\Delta_1$ recorded, the control device activates the pivotable belt 20 to pivot clockwise in the drawings so that the upper run 21 tilts forwards enabling the codfish 12 to fall off the downstream end onto the chute 24 along which it slides until it lands on the conveyor belt 25 still with its head end first. If a codfish is travelling tail-end-first past the photocells, because of the longer time difference $\Delta_2$ recorded, the control device activates the pivotable belt 20 to pivot anticlockwise (as shown in the drawings) so that the upper run 21 tilts backwards and in addition the conveying direction is reversed enabling the codfish 12 to fall off the upstream end head-end-first onto the chute 23 along which it slides until it lands on the conveyor belt 25 still with its head-end-first.

The process continues to ensure that all the codfish are oriented head-end-first and they are then fed to a grading machine or for further processing.

We claim:

1. An apparatus for aligning and uniformly orienting fish comprising:
   a shuffle feed device for aligning and discharging fish in a single line;
   a conveyor having a longitudinal upper run positioned for receiving and conveying aligned and discharged fish in a single line, in which fish are orientated in the longitudinal plane of the conveyor;
   a sensor comprising an upper photocell and a lower photocell positioned at a downstream end of the conveyor such that, in operation, the sensor distinguishes between head-end-first and tail-end-first orientations of fish passing the sensor based upon the sequence of activation of the photocells; and
   means controllable by the sensor for uniformly orienting fish passing the sensor in the same orientation.

2. An apparatus according to claim 1 wherein the means for uniformly orienting the fish comprises a control device which, in operation, records the time difference between activation of the upper and lower photocells and, based thereon, activates the means to uniformly orient the fish.

3. An apparatus according to claim 1 wherein the means for uniformly orienting the fish comprises a pivotable conveyor for receiving fish passing the sensor having a reversible belt positioned and configured to downwardly tilt at an upstream end and a downstream end about a transverse axis, a first chute and second chute positioned, respectively, to receive fish from the upstream end and downstream end of the pivotable conveyor when tilted, and an additional conveyor positioned for receiving fish from the chutes aligned in a uniform orientation.

4. An apparatus according to claim 3 wherein, in operation, the direction of travel of the belt of the pivotable conveyor is reversed when the upstream end of the pivotable conveyor is downwardly tilted.

5. An apparatus according to claim 1 further comprising a hopper in which the shuffle feed device is mounted.

6. An apparatus according to claim 5 further comprising a v-shaped conveyor positioned for transporting fish from the shuffle feed device to the conveyor juxtaposed to the sensor.

* * * * *